Figure 1:
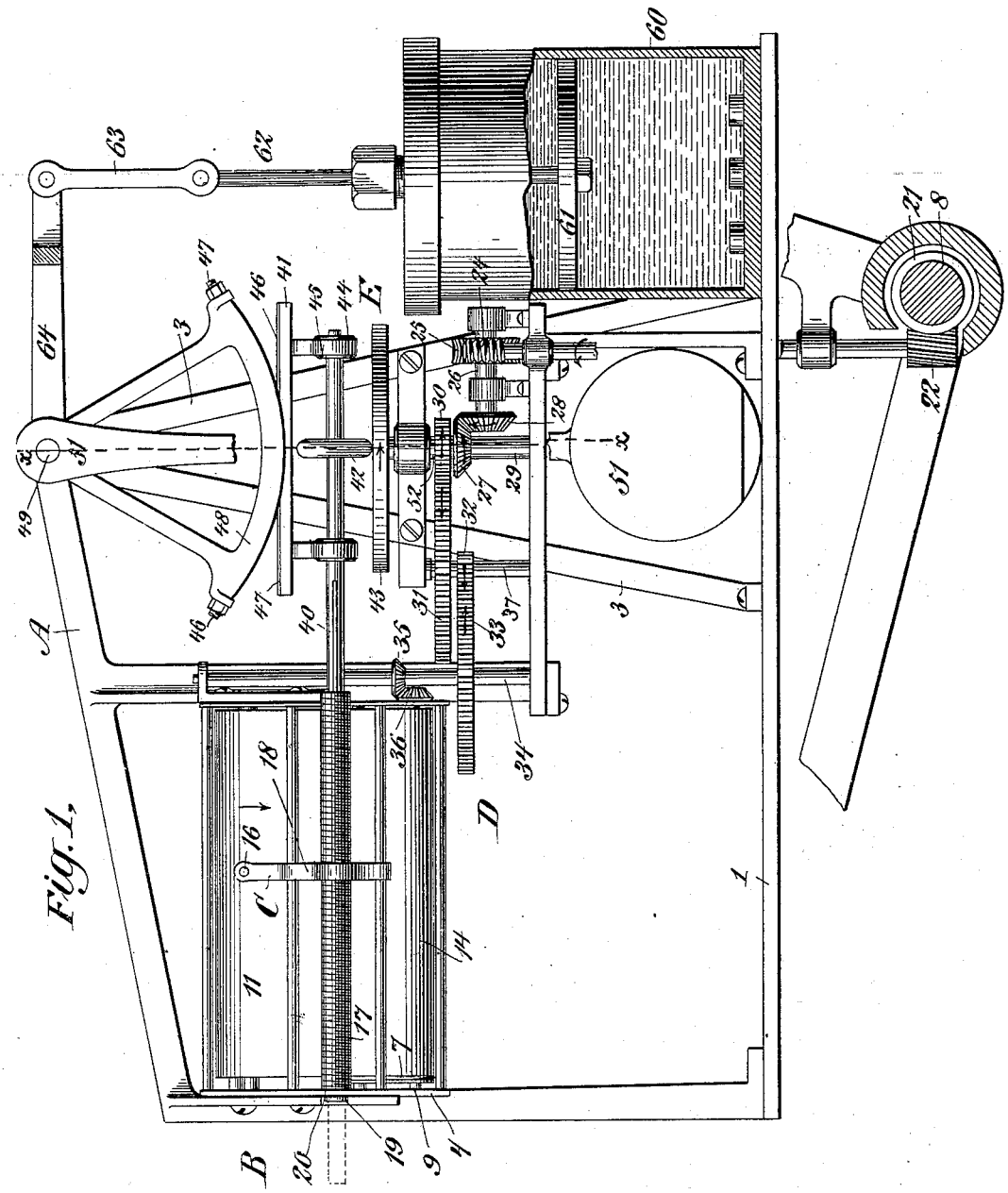

No. 624,268. Patented May 2, 1899.
E. A. UEHLING.
GRADE INDICATING AND PROFILE APPARATUS.
(Application filed Sept. 14, 1897.)
(No Model.) 4 Sheets—Sheet 1.

WITNESSES:

INVENTOR
Edward A. Uehling
BY
Chas. J. Earll
ATTORNEY

No. 624,268. Patented May 2, 1899.
E. A. UEHLING.
GRADE INDICATING AND PROFILE APPARATUS.
(Application filed Sept. 14, 1897.)
(No Model.) 4 Sheets—Sheet 2.
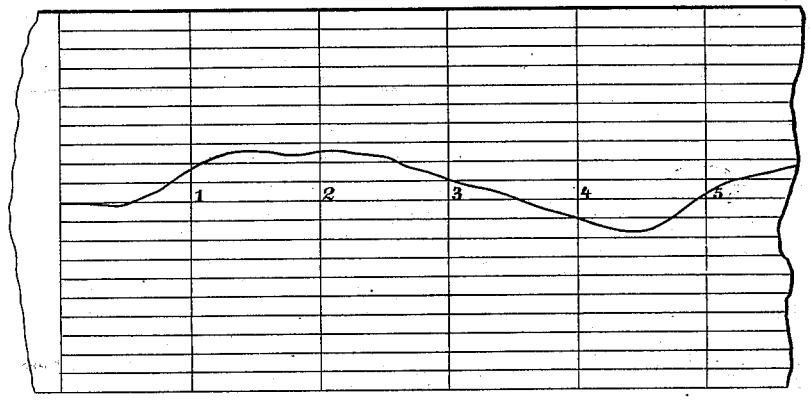
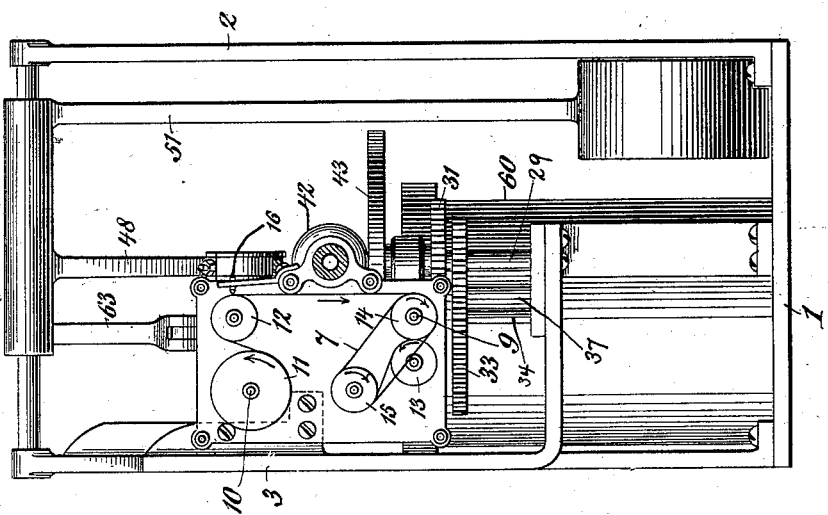
WITNESSES:
D. N. Rayport
E. J. Johnson.
INVENTOR
Edward A. Uehling
BY
Chas. J. Earll
ATTORNEY No. 624,268. Patented May 2, 1899.
E. A. UEHLING.
GRADE INDICATING AND PROFILE APPARATUS.
(Application filed Sept. 14, 1897.)
(No Model.) 4 Sheets—Sheet 3.
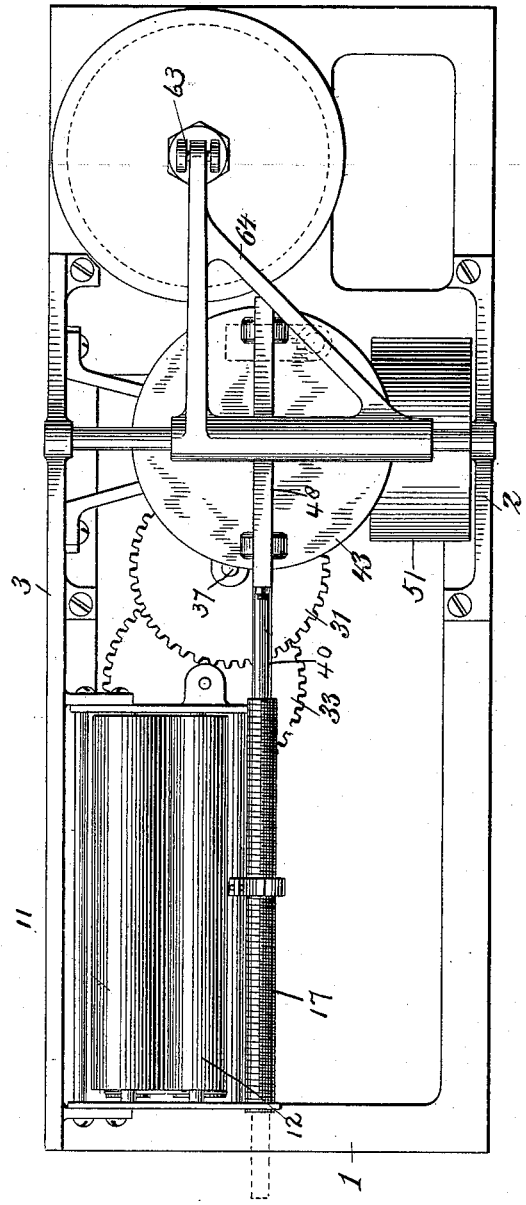
WITNESSES:
INVENTOR
Edward A. Uehling
BY
Chas. I. Earll
ATTORNEY No. 624,268. Patented May 2, 1899.
E. A. UEHLING.
GRADE INDICATING AND PROFILE APPARATUS.
(Application filed Sept. 14, 1897.)
(No Model.) 4 Sheets—Sheet 4.
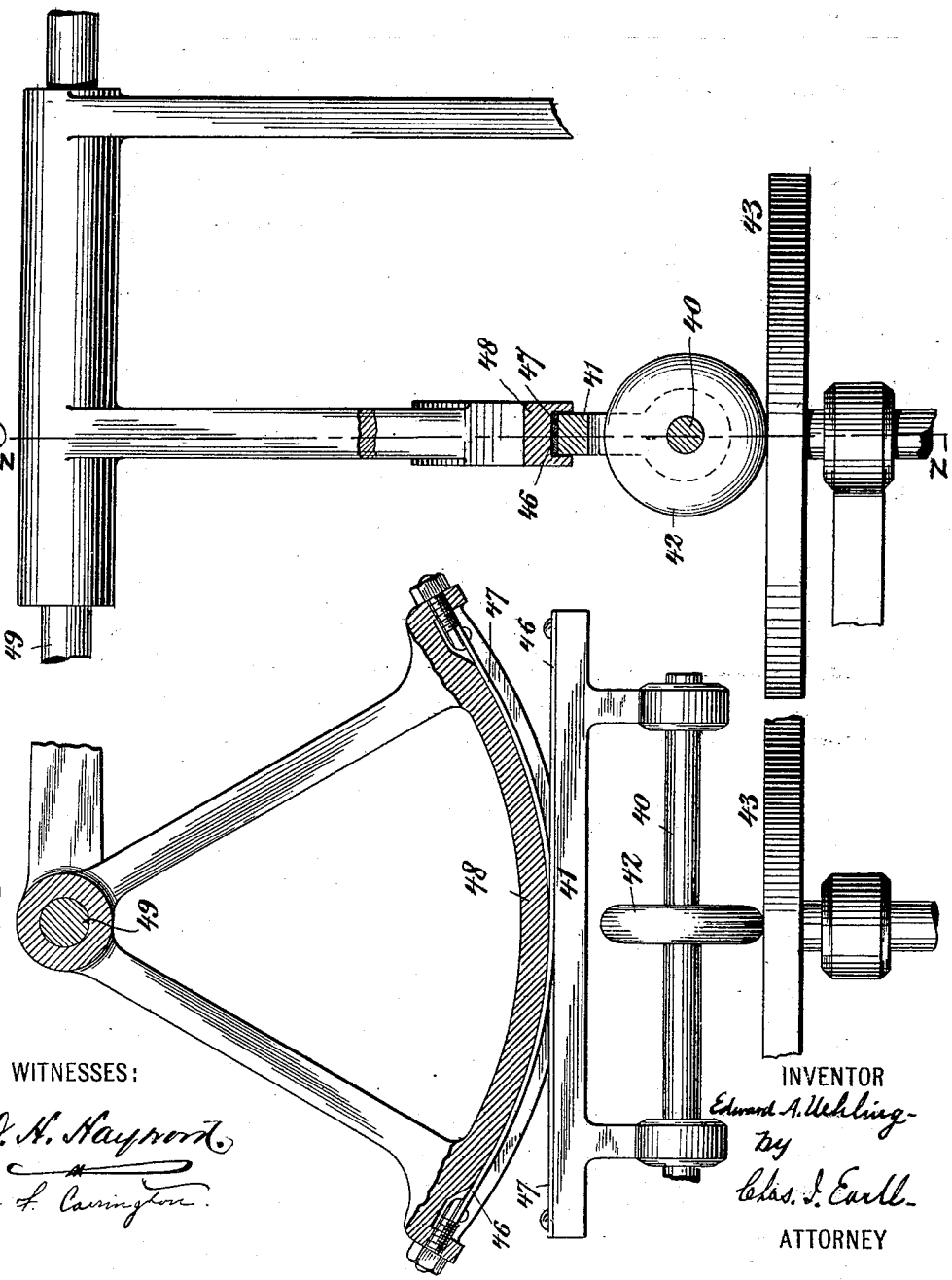
WITNESSES:
INVENTOR
ATTORNEY

UNITED STATES PATENT OFFICE.

EDWARD A. UEHLING, OF NEWARK, NEW JERSEY.

GRADE-INDICATING AND PROFILE APPARATUS.

SPECIFICATION forming part of Letters Patent No. 624,268, dated May 2, 1899.

Application filed September 14, 1897. Serial No. 651,663. (No model.)

*To all whom it may concern:*

Be it known that I, EDWARD A. UEHLING, a citizen of the United States, and a resident of Newark, in the county of Essex and State of New Jersey, have invented a new and useful Improvement in Grade-Indicating and Profile Apparatus, of which the following is a specification.

My invention relates to apparatus for automatically indicating terrestrial grades, levels, or altitudes.

The object of my invention is to provide an apparatus which when placed upon any suitable vehicle—such as a bicycle, carriage, railroad-car, or the like—and suitably connected to the running-gear thereof will automatically indicate differences of altitude or level over which the vehicle passes.

The object is, further, to produce an apparatus of the class described which shall automatically trace upon a chart of paper or other suitable material what is known in surveying and engineering as a "profile" of the line of travel of the vehicle.

In the drawings accompanying and forming part of this specification, Figure 1 is a side view of my invention. Fig. 2 is an end view. Fig. 3 is a plan. Fig. 4 represents a portion of a paper-roll on which the grade is recorded.
Fig. 5 is an enlarged sectional view on line $x\ x$, Fig. 1; and Fig. 6 is a partial section on line $z\ z$, Fig. 5.

Each part is designated by the same letters and figures of reference in all of the drawings.

My invention consists in so connecting a movable indicator with the running-gear of a vehicle that its position on a scale will indicate the altitude or level of the vehicle relatively to any other altitude or level over which the vehicle has passed.

My invention consists, further, in providing a tracing-point, as the point of a pencil, and a surface, as of paper or other suitable material adapted to receive impressions from the tracing-point, and in so connecting the tracing-point and the paper with the running-gear of the vehicle on which the apparatus is placed that they will have movement relative to each other, and thereby trace a line on the paper which by its contour shall indicate the profile of the surface over which the vehicle passed while the line was being traced.

My invention consists also in the novel construction and arrangements of parts hereinafter illustrated and described.

My invention comprises, in a general way, a framework, (designated generally by A,) a chart of paper or other suitable material (designated in a general way by B) adapted to receive the impressions for the tracing-point and adapted to receive motion from the running-gear of the vehicle, an indicator (designated generally by C) provided with a tracing-point adapted to have contact with the chart and to have transverse movement relative to the movement of the chart, mechanism (designated in a general way by D) connected to the running-gear of the vehicle for giving motion to the chart, and mechanism (designated in a general way by E) for giving motion to the tracing-point or indicator.

The chart upon which the tracing-point makes a record of the distances and elevations passed over is preferably made of a continuous roll of paper ruled longitudinally and transversely to certain scales, as shown in Fig. 4, such as is known in engineering and surveying as "profile-paper." It is obvious, however, that another form of chart could be used—as, for instance, a circular disk, such as is used in certain pressure-recording gages and the like. When profile-paper of the kind described is used, distance measured lengthwise of the roll represents distance along the line of travel passed over by the vehicle, and distance measured transversely of the roll represents vertical distances or differences of level.

It is customary and convenient for obvious reasons to use different scales for horizontal and vertical distances. Thus it may be convenient to have one inch on the horizontal scale represent one mile and on the vertical scale one hundred feet. The apparatus can easily be adapted to any combination of horizontal and vertical scales according to the requirements of any particular kind of service.

The movement of the chart is perpendicular to the movement of the tracing-point and is at a uniform rate relative to the movement of the vehicle, so that the longitudinal distance between two points on the chart measured by an appropriate scale will indicate the lineal distance passed over by the vehicle while the line between those two points was being traced. The movement of the tracing-point is at a variable rate and corresponds at all times to the inclination of the line of travel, and it may be in either direction according as the vehicle is ascending or descending, so that the transverse distance between two points or the projected distance on a line of the chart parallel to the movement of the point will indicate the vertical distance or difference of level passed through by the vehicle while the line was being traced.

In the preferred form of my invention herein shown and described the frame (designated generally by A) comprises a base 1, a front upright 2, a rear upright 3, and various other brackets and supports adapted to hold the working members of the mechanism, as clearly shown in the drawings.

The chart 11 is formed of a continuous roll of profile-paper supported by the shaft 10, from which it is led over the roller 12, where it receives the impression of the tracing-point, thence between the driving-roll 14 and pressure-roll 13, and finally to the shaft 15, upon which it is wound up.

The driving-roll 14, as here shown, is mounted on a shaft 9, on the end of which is the bevel-gear 36, and is driven by the worm 21 on an axle of the vehicle through a train of gears consisting of the bevel-pinion 35 and gear 33, mounted on the shaft 34, pinion 32 and gear 31, mounted on shaft 37, pinion 30 and bevel-gear 27, mounted on the shaft 29, bevel-gear 28 and the worm-wheel 25, mounted on the shaft 26, worm 24, the worm-wheel 22, and worm 21, as is clearly shown in the drawings. The shaft 8, carrying the worm 21, is secured to one of the supporting-wheels of the vehicle, or it may be geared to such a wheel, or, again, it may be secured or geared to a special wheel which comes in contact with the line of travel. The only requirement necessary to be fulfilled is that the train of gearing which connects the chart to the driving-wheel must be such that movement of the chart shall correspond, according to the adopted scale, to the lineal movement of the vehicle.

The roll 15, on which the chart is wound after passing between the rolls 13 and 14, is driven from the roll 14 by means of the belt 7, the varying diameter of the roll 15 as the chart is wound up being compensated for by a slipping of the belt 7.

The tracing-point 16 is held in the carrier 18, which is threaded internally and mounted on the screw 17, so that the turning of the screw in one direction or the other will move the tracing-point to the right or left, as seen in Fig. 1. The screw 17 is adapted to receive within it the shaft 40, to which it is connected by means of a feather, so that it shall turn with the shaft, but permit the shaft to have independent longitudinal movement. The screw 17 is journaled in the bracket 4 of the frame A and is prevented from moving longitudinally by the collar 19 and shoulder 20. The shaft 40 is journaled in the sliding frame 41 and is provided with the friction-wheel 42, adapted to come in contact with and receive motion from the friction-disk 43. By means of the collars 44 and 45 on the shaft 40 the shaft is caused to move longitudinally with the slide 41. The slide 41 is connected, by means of the ribbons 46 and 47, to the segmental arc 48, or it may be connected by means of a rack upon the slide 41 and gear-teeth upon the arc 48, so that as the arc or segment 48 turns about the shaft 49 the slide 41 and friction-wheel 42 are moved to the right or left, as the case may be, as seen in Fig. 1. The segment 48 is connected by the sleeve 50 to the pendulum 51.

In case it is not desired to record the variations in grade of the line of travel that is to produce a profile, but only to indicate at each instant the elevation of the position occupied by the vehicle at that instant, the chart, with so much of the mechanism as is necessary for its operation, may be dispensed with. In this case the carrier 18 is provided with a suitable pointer and in place of the chart a suitable scale is arranged underneath the pointer. The apparatus is adjusted to occupy the position shown in Fig. 1 when the vehicle on which it is placed is on level ground, in which case the friction-wheel 42 is in contact with the center of the friction-disk 43, and consequently the said friction-wheel receives no motion from the motion of the friction-disk. It is obvious that if the frame of the apparatus is inclined from the horizontal position, as shown in Fig. 1, the pendulum 51, being free to maintain its vertical position, will, through the connection described, carry the friction-wheel 42 away from the center of the friction-disk 43 by an amount proportional to the inclination of the line of travel and the friction-wheel will rotate at a speed relative to the rotation of the friction-disk 43, which is proportional to the distance that the friction-wheel 42 has been moved from its central position. It is also obvious that if the apparatus is inclined in one direction—say when the vehicle is going uphill—the friction-wheel will be turned in a certain direction and that when the apparatus is inclined in the opposite direction—say when the vehicle is going downhill—the friction-wheel, being carried to the other side of the center of the friction-disk, will rotate in the opposite direction. The friction-disk 43 is attached to the upper end of the shaft 52, on which is attached also the pinion 30 and the bevel-gear 27. It is obvious that the friction-disk 43 may be connected in any suitable way to the running-gear of the vehicle that will give it the proper relative speed and permit it to be placed in a proper position relative to the friction-wheel 42. Thus the screw 17 is made to turn at a rate relative to the movement of the vehicle, which is proportional to the inclination that the line of travel makes with the horizontal line, and its direction of rotation is dependent upon whether the vehicle is ascending or descending, and thus the transverse movement of the indicator and of the tracing-point upon the chart corresponds in direction and amount with the direction and amount of vertical distance passed through by the vehicle.

In order to give the pendulum a steady motion and to prevent undue swinging back and forth, I provide a cylinder 60, piston 61, and piston-rod 62, connected by the link 63 to the arm 64, which arm is attached to the sleeve 50. The piston 61 fits the cylinder loosely, so as to permit the fluid to pass from one side to the other of the piston as it moves up and down, the result being that the pendulum is retarded from rapid movement, while very little, if any, resistance is offered to the slow change of position resulting from any ordinary change of grade.

Having thus described my invention, what I claim is—

1. In an apparatus for indicating differences of altitude, the combination with the running-gear of a vehicle, of a movable indicator, mounted on an internally-threaded sleeve or nut, a threaded screw engaging said nut and having a central bore into which is received a shaft connected therewith by a feather, a friction-wheel on said shaft, a sliding frame in which said shaft is journaled for giving it longitudinal movement, a pendulum connected to said sliding frame and controlling its movement, and a friction-disk having contact with the friction-wheel and connected with the said running-gear.

2. In an apparatus for indicating differences of altitude, the combination with the running-gear of a vehicle, of a movable indicator mounted on an internally-threaded sleeve or nut, a threaded screw engaging said nut having a central bore into which is received a shaft connected therewith by a feather, a friction-wheel on said shaft, the sliding frame 41 in which said shaft is journaled for giving it longitudinal movement, the segmental arc 48 pivotally mounted and connected with said frame by means of the ribbons 46, 47, a pendulum controlling the movement of said segmental arc connected with said segmental arc and controlling its movement, and a friction-disk having contact with the friction-wheel and connected with said running-gear.

In testimony that I claim the foregoing as my invention I have signed my name, in presence of two witnesses, this 9th day of September, 1897.

EDWARD A. UEHLING.

Witnesses:
J. B. MAXWELL,
CHAS. W. WESTON.